(12) United States Patent
Bastide et al.

(10) Patent No.: US 11,805,089 B2
(45) Date of Patent: Oct. 31, 2023

(54) CONVERSATION SLIPSTREAM PROPAGATION

(71) Applicant: International Business Machines Corporation, Armonk, NY (US)

(72) Inventors: Paul R. Bastide, Ashland, MA (US); Robert E. Loredo, North Miami Beach, FL (US); Fang Lu, Billerica, MA (US); Matthew E. Broomhall, Goffstown, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/549,856

(22) Filed: Dec. 13, 2021

(65) Prior Publication Data

US 2022/0103503 A1    Mar. 31, 2022

Related U.S. Application Data

(63) Continuation of application No. 16/803,886, filed on Feb. 27, 2020, now Pat. No. 11,201,841.

(51) Int. Cl.
*H04L 51/216* (2022.01)
*G06N 20/00* (2019.01)
(Continued)

(52) U.S. Cl.
CPC ........... *H04L 51/216* (2022.05); *G06N 20/00* (2019.01); *H04L 51/52* (2022.05); *H04L 67/535* (2022.05); *H04L 67/75* (2022.05)

(58) Field of Classification Search
CPC ..... H04L 51/216; H04L 67/535; H04L 67/75; H04L 51/222; H04L 12/1831; G06N 20/00; G06N 3/0454; G06N 7/005; G06N 5/022
See application file for complete search history.

(56) References Cited

U.S. PATENT DOCUMENTS

| | | | |
|---|---|---|---|
| 11,201,841 B2 | 12/2021 | Bastide et al. | |
| 2011/0320545 A1 | 12/2011 | Hammer et al. | |
| 2012/0110085 A1* | 5/2012 | Malik | G06F 16/955 709/205 |

(Continued)

FOREIGN PATENT DOCUMENTS

CN    107786432 A    3/2018

OTHER PUBLICATIONS

IBM: List of IBM Patents or Patent Applications Treated as Related, 2 pg.

(Continued)

*Primary Examiner* — Anh Nguyen
(74) *Attorney, Agent, or Firm* — CUENOT, FORSYTHE & KIM, L.L.C.

(57) ABSTRACT

Conversation slipstream propagation can include using machine learning to construct a conversations graph representing conversations conducted over an electronic communications network by a plurality of participants and collected from one or more messaging platforms. A conversation slipstream comprising one or more communications extracted from the conversations can be generated in response to receiving a secondary communication over the electronic communications network. Each of the one or more communications extracted is represented by a sub-graph of the conversations graph, each sub-graph corresponding to a graph of the secondary communication. The conversation slipstream can be presented to at least one participant to the secondary communication.

18 Claims, 8 Drawing Sheets

(51) Int. Cl.
   *H04L 51/52*   (2022.01)
   *H04L 67/75*   (2022.01)
   *H04L 67/50*   (2022.01)

(56) References Cited

U.S. PATENT DOCUMENTS

| | | |
|---|---|---|
| 2014/0324984 A1 | 10/2014 | Chang et al. |
| 2019/0095833 A1 | 3/2019 | Bastide et al. |
| 2019/0149651 A1 | 5/2019 | Tokuchi |
| 2019/0325868 A1* | 10/2019 | Lecue ................. G10L 25/63 |
| 2020/0342032 A1* | 10/2020 | Subramaniam ....... G10L 15/063 |
| 2021/0273899 A1 | 9/2021 | Bastide et al. |

OTHER PUBLICATIONS

Bastide et al., "Conversation Slipstream Propagation", U.S. Appl. No. 16/803,886, filed Feb. 27, 2020, 55 pages (A copy is not provided as this application is available to the Examiner.
Mell, P. et al., The NIST Definition of Cloud Computing, National Institute of Standards and Technology, U.S. Dept. of Commerce, Special Publication 800-145, Sep. 2011, 7 pg.

* cited by examiner

CONVERSATION SLIPSTREAM PROPAGATION

BACKGROUND

This disclosure relates to electronic communications, and more particularly, to aggregating, analyzing and combining conversations conducted over one or more electronic communications networks using one or more communication platforms.

Electronic communications via a local area network, the Internet, or various other electronic communications networks enable individuals remotely situated from one another to connect, share information, and engage in conversations. Conversations are enhanced with the use of messaging platforms and services. Social networking services, for example, provide online platforms that enable individuals to build social relationships with others who share common personal or career interests. Team collaboration platforms, for example, provide collaboration software tools that allow multiple individuals who are jointly working on a project or task to share, process, and manage files, documents, and data, as well as communicate with one another so as to more efficiently accomplish a task or complete a project.

SUMMARY

In one or more embodiments, a method includes constructing, with computer hardware using machine learning, a conversations graph representing conversations conducted over an electronic communications network by a plurality of participants and collected from at least one messaging platform. The method also includes generating a conversation slipstream comprising at least one communication that is extracted from the conversations in response to receiving a secondary communication over the electronic communications network. The at least one communication is represented by a sub-graph of the conversations graph that corresponds to a graph of the secondary communication. Additionally, the method includes presenting the conversation slipstream to one or more participants to the secondary communication.

In one or more embodiments, a system includes a processor configured to initiate operations. The operations include constructing, using machine learning, a conversations graph representing conversations conducted over an electronic communications network by a plurality of participants and collected from at least one messaging platform. The operations also include generating a conversation slipstream comprising at least one communication that is extracted from the conversations in response to receiving a secondary communication over the electronic communications network. The at least one communication is represented by a sub-graph of the conversations graph that corresponds to a graph of the secondary communication. Additionally, the operations include presenting the conversation slipstream to one or more participants to the secondary communication.

In one or more embodiments, a computer program product includes at least one non-transitory computer-readable storage medium having instructions stored thereon. The instructions are executable by a processor to initiate operations. The operations include constructing, using machine learning, a conversations graph representing conversations conducted over an electronic communications network by a plurality of participants and collected from at least one messaging platform. The operations also include generating a conversation slipstream comprising at least one communication that is extracted from the conversations in response to receiving a secondary communication over the electronic communications network. The at least one communication is represented by a sub-graph of the conversations graph that corresponds to a graph of the secondary communication. Additionally, the operations include presenting the conversation slipstream to one or more participants to the secondary communication.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
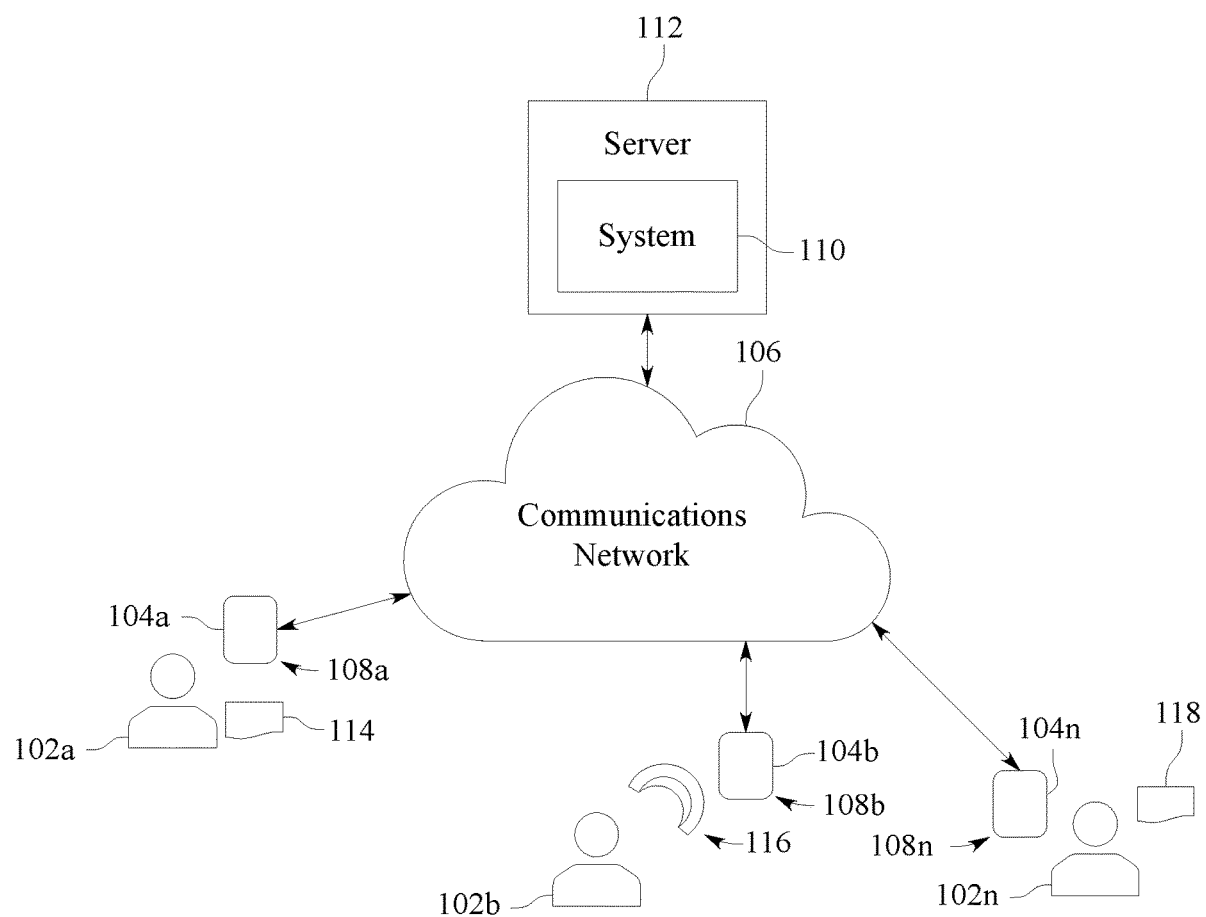
FIG. 1 depicts an example communication environment in which a conversation slipstream system is operable according to an embodiment.

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to electronic communications, and more particularly, to aggregating, analyzing and combining conversations conducted over one or more electronic communications networks using one or more communication platforms. Online social networks, team collaboration platforms, and other messaging platforms enable users to engage in conversations and exchange information rapidly and efficiently. Using such well-known mechanisms such as a channel, an inbox, a wall, an activity stream, a timeline, or a profile, users can connect and converse with one another and share information in a logical and organized manner.

With a seemingly ever-increasing number of conversations and ever-expanding array of communication platforms, however, a user may overlook an important communication that is obscured within the large volume of messages and conversations the user may encounter daily. One conversation may terminate inconclusively if the user must cut the conversation short to begin another one or attend to a matter that is temporarily more pressing. The user is then forced to "pick up the pieces" of the earlier conversation when that conversation is resumed. Resuming a conversation can involve recalling or re-establishing an earlier exchange of information. A user who is part of a collaboration or chat group may be unable to benefit from or participate in an online conversation that has progressed to any significant extent before the user is able to join the conversation. Moreover, there is little or no opportunity for the user to benefit from a conversation the user is unaware of, even though the user may have a legitimate reason to be part of the conversation or otherwise to have access to information exchanged during the conversation. For example, a user who is a member of a work group may benefit from information discussed during a conversation that concluded before the user was able to join. Likewise, for example, teams of individuals who are members of the same enterprise or organization but work on different projects may be unaware of each other's conversations regarding separate projects and thus do not benefit from each other's conversations or exchange of information, notwithstanding that the information may be equally relevant to both their respective projects. Moreover, there typically is no mechanism for members of different organizations to share conversations even if doing so could benefit both organizations' respective members.

In accordance with the inventive arrangements disclosed herein, conversations conducted on one or more communication platforms (e.g., team collaboration platform, social networking platform, email messaging platform) over one or more electronic communications networks (e.g., local area network, the Internet) can be aggregated into a single collection of conversations. The collected conversations may be those of a collaboration group, a social network, chat group or other group of individuals. The collected conversations may be those of a single individual.

In response to receiving a new, or secondary, communication over an electronic communications network, a conversation slipstream can be culled from the collected conversations, and an enhanced conversation can be created by combining the conversation slipstream and the secondary communication. The enhanced conversation can seamlessly conjoin different conversation threads (conversation slipstream and secondary communication) into a conversation that is enhanced by connecting the secondary communication with logically relevant communications extracted from the larger collection of conversations.

As defined herein, a "conversation" comprises a series of communications exchanged over an electronic communications network, the exchange involving two or more users or individuals identifiable as participants to the conversation. Relatedly, as defined herein, a "communication" is a message from one individual to one or more other individuals that is conveyed over an electronic communications network. The message can be conveyed using a messaging platform (e.g., social networking platform, team collaboration platform). The messaging platform enables a user to convey a message, an electronic mail (email), a post, any other type of message comprising text, or text generated from a spoken utterance by a voice-to-text processor. The text message, email, post, or other message can convey, for example, information or express the user's thoughts (e.g., facts, observations, opinions) to one or more other users. "Slipstream," as defined herein, is a sequence of communications that follow an initial ("root") communication and that are related to one another by subject matter, theme, topic, concept, category or some other logical structure.

As defined herein, an "enhanced conversation" is a chain of logically linked communications, the chain created by combining a newly received communication and a conversation slipstream. The newly received communication is defined herein as a "secondary communication." Accordingly, a secondary communication can comprise, for example, a message or other communication that may otherwise be obscured if isolated from one or more related communications among a plethora of unrelated ones. However, when added to a conversation slipstream that includes the communications to which the secondary communication is logically related, the likelihood that the secondary communication is overlooked can be significantly reduced.

A secondary communication, for example, can be logically related to an extended conversation that ended inconclusively. When the secondary communication is combined with a conversation slipstream comprising all or selected portions of the earlier conversation, the resulting enhanced conversation obviates a need for the users to rehash or reconstruct all or parts of the earlier conversation when the conversation is resumed. Likewise, an enhanced conversation can comprise a secondary communication initiated by a user who is newly joining a collaboration or chat group. The enhanced conversation combines the secondary communication and a conversation slipstream comprising one or more earlier conversations of the collaboration or chat group. If a user, though a member of the group, did not have the benefit of having access to or did not participate in the earlier conversation, the enhanced conversation resulting from combining the secondary communication and the conversation slipstream comprising the earlier conversation can provide the user with information the user otherwise would lack and which the user needs to participate fully in an on-going conversation.

Users who are granted access to communications of other users—for example, members of the same enterprise or members of separate enterprises that agree to share information—can benefit by having a conversation regarding one project treated as a secondary communication and having that secondary communication added to a conversation slipstream that, though derived from conversations regarding a wholly different project, nonetheless contains communications that can fill in information gaps users have regarding their own project. For example, a conversation of one team about one project may provide extensive discussion or information about a concept or topic relevant to a different team communicating about a different project. The latter team may benefit from the extensive discussion or information from the former's conversation, especially if the latter would otherwise have little or no knowledge about the concept or topic or has little expertise or experience related to the concept or topic. Thus, one group of participants to a conversation can gain the benefit of information conveyed by a wholly different group during a different conversation, provided both groups have a legitimate basis for accessing each other's conversations (e.g., members of the same organization or of different organizations that have agreed to such a sharing arrangement).

As described herein, the logical structures underlying generation of a conversation slipstream and the creation of an enhanced conversation are determined by computer hardware that implements certain forms of artificial intelligence. The artificial intelligence in certain embodiments is implemented with machine learning. Machine learning essentially enables machines (computers) to "learn" to discover statistical relationships. In artificial intelligence, such statistical relationships have proven more robust than rule-based processing of data.

The logical structures can be represented by a conversations graph comprising nodes (or vertices) and edges that correspond to communications, as well as various types of data and/or metadata associated with and/or characterizing aspects of the communications. An edge connecting two or more nodes corresponds to a logical relation between the communications represented by the nodes. A collection of conversations involving a specific group (e.g., collaboration group, chat group) or an individual can be represented by a single conversations graph that tracks relationships (if any) among all the conversations in the collection. Sub-graphs corresponding to different conversations contained in the collection exhibit distinct paths (a sequence of two or more edge-connected nodes) that represent logical relationships between communications and associated data. The nodes and edges of a conversation comprise paths and patterns that uniquely correspond to the conversation. Comparison of the paths and patterns of different conversations (inter-conversation comparison), as well as communications within a conversation (intra-conversation comparison), can reveal whether and to what extent one conversation or communication relates logically to another.

In response to receiving a secondary communication over an electronic communication network, a graph of the secondary communication can be generated and compared to the sub-graphs of the conversations graph. The comparison can identify communications contained in the collection that have a logical relationship (if any) to the secondary communication. Those conversations or portions thereof (individual communications within a conversation) can be extracted from the collection and used to generate a conversation slipstream that can be conveyed to one or more participants to a conversation that includes the secondary communication. Optionally, based on machine-learned models, the secondary communication can be combined with the conversation slipstream to create an enhanced conversation. The enhanced conversation can be conveyed to one or more participants to a conversation.

The arrangements described herein are directed to computer technology and provide an improvement to computer technology. Specifically, the present arrangements improve the operative capacity of messaging platforms (e.g., collaboration platform, social networking platform, email messaging platform). For example, one aspect of the arrangements is a capability to automatically connect logically related communications, obviating the need for individual, multiple network searches and retrieval by multiple users seeking to link the communications. Another aspect, for example, is a capability to automatically connect logically related communications that individual users are otherwise unable to connect owing to the users having only incomplete information about the separate communications. By automatically closing information gaps inherent in network communications, the arrangements can reduce the use of network resources in duplicative efforts by multiple users.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, example communication environment 100 is depicted. Communication environment 100 is a communication environment (e.g., cloud-based) in which a conversation slipstream system is operable according to an embodiment. Illustratively, communication environment 100 includes multiple users 102a, 102b, and 102n who communicate with one another using communication devices 104a, 104b, and 104n, respectively. Although only three such users and user devices are shown, it will be readily recognized that communications environment 100 can include many more users and user devices or as few as only two.

Communication devices 104a-104n can comprise various types of electronic devices, including, for example, a smartphone or other mobile device, a computer (e.g., desktop, laptop, tablet computer), virtual assistant, smart TV, or other communication/computing device. It will be appreciated that in various embodiments one or more of communication devices 104a-104n can be deployed as a standalone device or deployed as multiple devices in a distributed client-server networked system. For example, in certain embodiments, a smartwatch can operatively couple to a mobile device (e.g., cell phone).

Illustratively, communication devices 104a-104n communicatively couple with one another via electronic communications network 106. Electronic communications network 106 provides communication links between various devices and data processing systems. Electronic communications network 106 can link users 102a-102n using communication devices 104a-104n, for example, to an instant messaging service, a team collaboration service, a social networking service, or similar service or messaging platform. The communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, a public switched telephone network (PSTN), and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system or team collaboration platform. A communication link for exchanging text messages is considered a distinct communication link. Likewise, a communication link for exchanging emails is a distinct communication link, as is a communication link for video calls and a communication link for voice calls. So, too, a communication link used for posting to a social networking system or team collaboration platform is considered a distinct communication link. Accordingly, each type of communication link corresponding to a different type or mode of communication is considered a distinct communication link.

Illustratively, users 102a and 102n communicate via text messages 114 and 118. User 102b communicates via spoken message 116, which is converted to text by a speech-to-text processor (not shown). Each such communication is conveyed over electronic communications network 106 during a conversation involving an exchange of multiple communications between the specific users during a specific span of time.

Each of communication devices 104a-104n is endowed with processing capabilities and/or circuitry 108a, 108b, and 108n that connects to an instant messaging service, a team collaboration service, a social networking service, and/or similar service or messaging platform via electronic communications network 106. Conversation slipstream system 110, according to an embodiment, can be operatively coupled to or integrated in an instant messaging service, a team collaboration service, a social networking service, or similar service or messaging platform to which communication devices 104a-104n are communicatively linked via electronic communications network 106. Indeed, conversation slipstream system 110 can be operatively combined with any networking or messaging platform, such as ones using an application layer protocol (e.g., Internet Relay Chat, XMPP, or similar proprietary protocol) for communications—both group communications in discussion forums ("channels) and one-to-one communications via private messaging platforms—as well as for data transfers and file sharing. Conversation slipstream system 110 optionally can include a speech-to-text processor for converting voice into text to enable the system to perform the functions described herein with respect to voice-based communications as well as text-based communications.

Conversation slipstream system 110, in certain embodiments, is implemented as a set of computer system-executable instructions illustratively executing on server 112, which communicatively couples to communication devices 104a-104n via electronic communications network 106. Accordingly, conversation slipstream system 110 can be implemented in various types of computer systems (e.g., cloud-based server) such as computer system 712 described with reference to FIG. 7. In various embodiments, conversation slipstream system 110 can be implemented in computer system-executable instructions, in dedicated circuitry, or in a combination of circuitry and computer system-executable instructions.

Figure 2A:
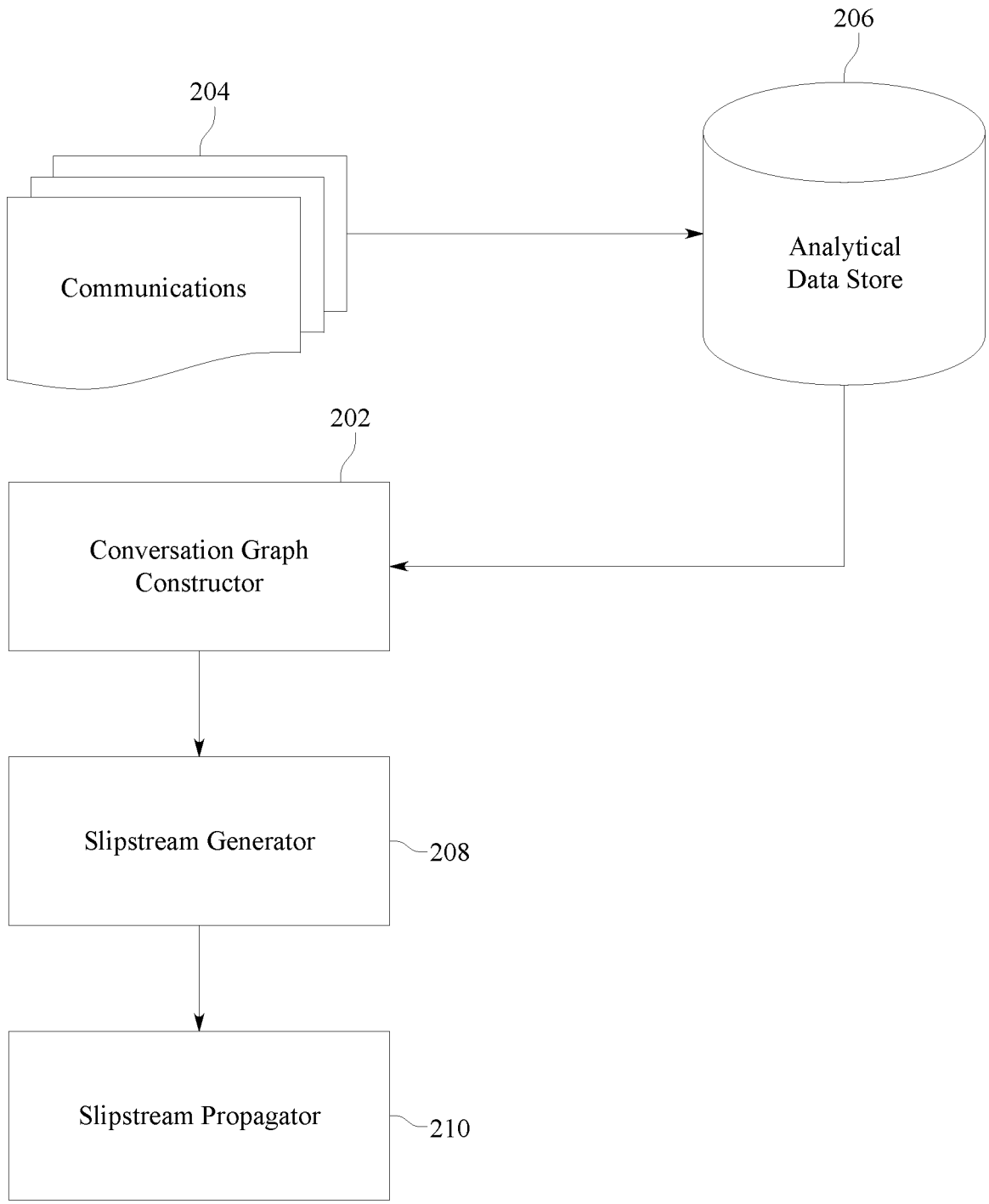
FIGS. 2A and 2B depict certain components and operative aspects of an example conversation slipstream system according to an embodiment.
Figure 2B:
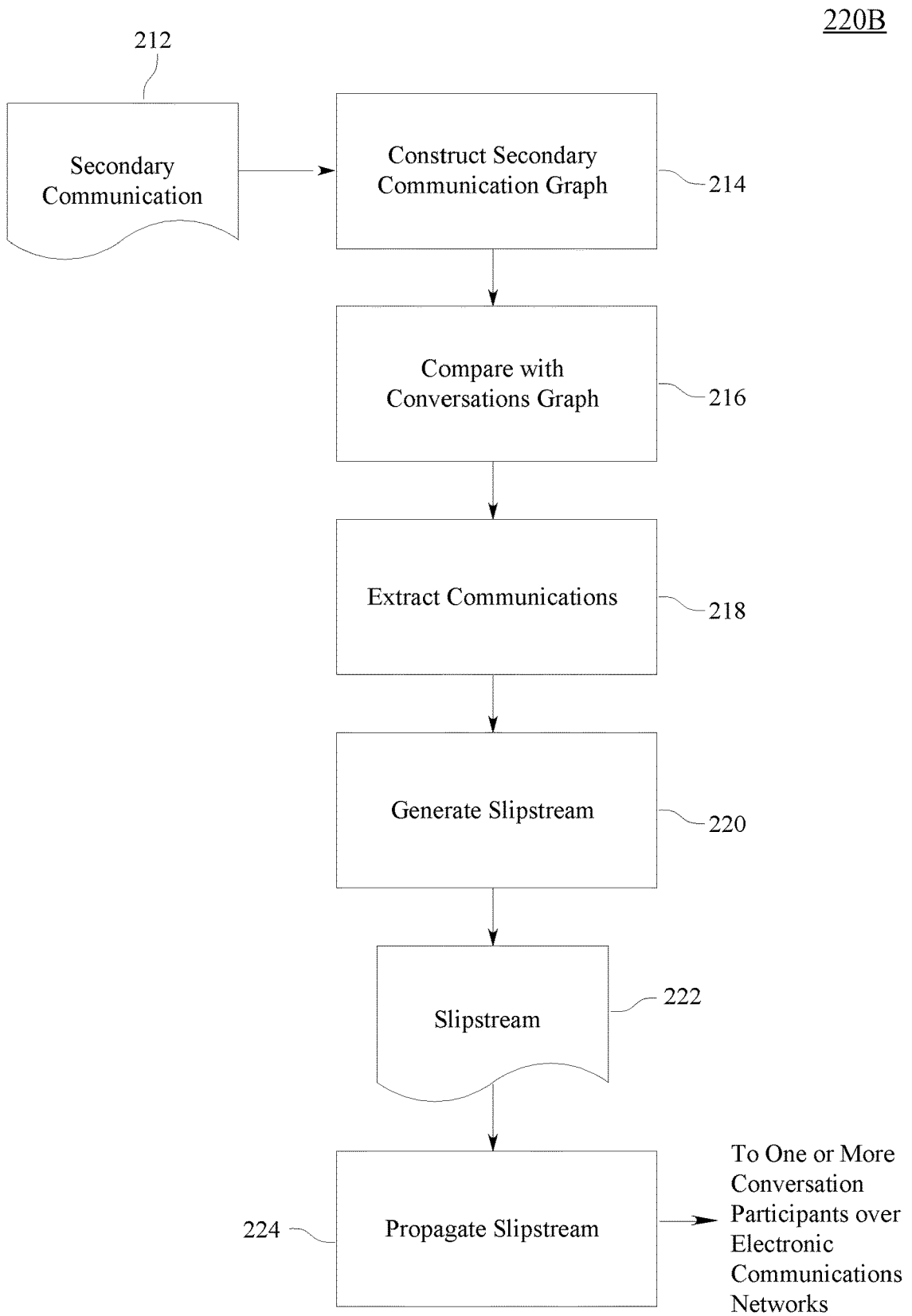

Referring now to FIGS. 2A and 2B, certain components 200a and operative aspects 200b of an example conversation slipstream system, according to one embodiment, are depicted. As depicted in FIG. 2A, components 200a of the conversation slipstream system illustratively include conversations graph constructor 202, analytical data store 206, slipstream generator 208, and slipstream propagator 210. Conversations graph constructor 202, analytical data store 206, slipstream generator 208, and slipstream propagator 210 can be implemented in a set of computer system-executable instructions, in dedicated circuitry, or with a combination of circuitry and computer system-executable instructions.

Operatively, conversations graph constructor 202 builds a conversations graph representing conversations (each comprising one or more communications 204) that are electronically stored in analytical data store 206. The conversations on which the graph is based can be collected from one or more instant messaging platforms, one or more team collaboration platforms, one or more social networking platforms, or other such messaging platforms. The conversations collected from one or more of various types of communication platforms (e.g., team collaboration, social networking) can be conversations that pertain to a specific collaboration team, chat group, or other such group. Alternatively, the collected conversations can be those of a single individual.

FIG. 2B depicts operative aspects 200b of the conversation slipstream system in response receiving secondary communication 212 over an electronic communications network with which the system is communicatively coupled. Secondary communication 212 can be conveyed on an instant messaging platform, a team collaboration platform, a social networking platform, or similar messaging platform that is communicatively coupled to the electronic communications network (e.g., LAN, WAN, the Internet). Conversations graph constructor 202 constructs a graph at block 214, the graph representing secondary communication 212. Slipstream generator 208 at block 216 compares the graph representing secondary communication 212 to the conversations graph representing conversations corresponding to communications 204 to determine, based on one or more predetermined similarity criteria described below, whether any communications 204 are relevant to secondary communication 212. Each one of communications 204 corresponds to a sub-graph of the communication graph, and each communication's corresponding sub-graph is used to determine similarity with the graph of secondary communication 212 to determine, according to the predetermined selection criterion, whether any communications are relevant to secondary communication 212. If so, the relevant communications are extracted from the analytical data store 206 at block 218. From the extracted communications, slipstream generator 208 at block 220 generates conversation slipstream 222. Slipstream propagator 210 propagates conversation slipstream 222 at block 224. Conversation slipstream 222 can be propagated by conveying conversation slipstream 220 over a data communications network to one or more conversation participants (e.g., author, recipient, other) in secondary communication 212.

Figure 3:
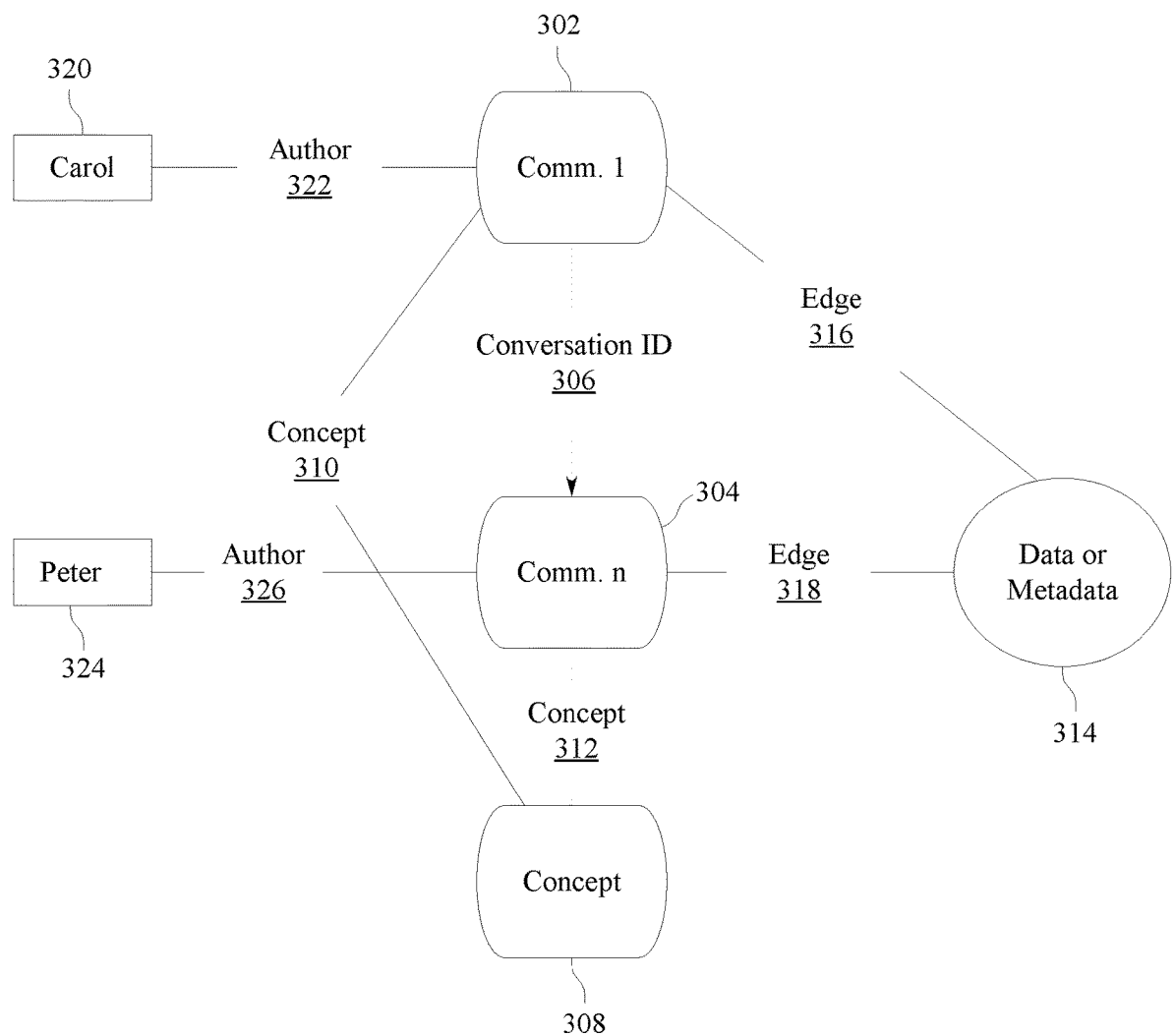
FIG. 3 depicts an example sub-graph of a conversations graph generated by a conversation slipstream system according to an embodiment.

The conversations graph generated by conversations graph constructor 202 comprises multiple edge-connected nodes that represent in a single graph the complete collection of conversations electronically stored in analytical data store 206. Each conversation can be represented by a graph that, when connected with other graphs representing other conversations in the collection, forms a sub-graph of the single, larger conversations graph corresponding to the complete collection of conversations. Referring additionally to FIG. 3, example sub-graph 300 depicts but one of many such sub-graphs that can make up a conversations graph. Illustratively, sub-graph 300 includes node 302 corresponding to the text of a first communication, and node 304 corresponding to the text of an n-th communication (n is any integer). Various other communications can be part of the conversation though not explicitly shown. The first and n-th communications are part of a conversation (various communications other than the first and n-th can be part of the conversation) and, accordingly, unique conversation identifier, conversation ID edge 306, can connect nodes 302 and 304. A node can represent a concept, theme, topic, or category of a communication (which can be determined using machine learning described below). Node 302 illustratively relates to a concept represented by concept node 308. Concept edge 310 connects node 302 to concept node

308. Node 304 also relates to the concept and is connected to concept node 308 by concept edge 312. The result is a nodal path represented as follows: [comm. 1] [concept] [comm. 2]. The conversation can include other communication nodes and other nodes (node shown) representing different concepts, themes, topics, and/or categories depending on the extent of the conversation.

Each communication that is part of a conversation also can be associated with various data and/or metadata, examples of which are described in detail below. As shown in FIG. 3, certain data or metadata pertinent to both the first and n-th communication is illustratively represented by node 314. Node 302 corresponding to the first communication text is connected by edge 316 to node 314, and node 304 corresponding to the n-th communication text is connected to node 314 by edge 318. The edges connecting both node 302 and node 304 to node 314 create an additional nodal path represented as [comm. 1] [data or metadata] [comm. 2]. All the various types of data and metadata that can be associated with a conversation can be represented by a node such as node 314. For example, in FIG. 3 data indicating the author (Carol) of the first communication is represented by node 320 and is connected to node 302 (corresponding to the author's communication text) by author edge 322. Similarly, data indicating the author (Peter) of the n-th communication is represented by node 324 and is connected to node 304 (the author's communication text) by author edge 326. Were there a predetermined logical connection between the authors, yet a third nodal path would be created.

The greater the amount of data and/or metadata—whether corresponding to multiple topics, themes, concepts, categories, author-recipient linkages, author-author linkages, time of communication, or the like—associated with each communication, the greater the number of possible nodal paths that correspond to a conversation sub-graph such as sub-graph 300. The nodal paths create unique patterns, or type of digital fingerprint, that can distinguish one sub-graph from another or exhibit similarity to one degree or another between a pair of sub-graphs (or graph). Referring still to FIG. 2, conversation slipstream system 200 can implement natural language processing and machine learning for generating machine-learned models (e.g., classification models, probabilistic topic models) that can identify and classify the nodal paths and patterns, as described below. Slipstream generator 208 can leverage the uniqueness of the paths and patterns of different sub-graphs in selecting conversations and extracting communications therefrom for generating a conversation slipstream in response to a received secondary communication.

The conversations (each comprising one or more communications 204) on which the conversations graph is based and from which communications 204 are extracted can be automatically collected by conversation slipstream system 200 and archived in analytical data store 206. Conversation slipstream system 200 can retrieve conversations from instant messaging platforms, from collaboration platforms, from social networking platforms, and/or other messaging platforms. In certain embodiments, conversation slipstream system 200 can use a tool such as Gnip® or Actiance® to pull data from social media or collaboration services (e.g., IBM Verse®, Gmail®, Slack®, Sametime®, SMS, Apple iMessage®, Skype®). Conversation slipstream system 200 can select conversations for archiving in analytical data store 206 based on a unique conversation identifier, a conversation resolution (complete, incomplete, evolving), and/or time of communication. Other data and/or metadata described below can be associated with each conversation and used to select conversations for archiving in analytical data store 206. The conversations collected for archival in analytical data store 206 can be time ordered to ensure a logical sequencing of conversations based on the relative timing of each. The conversations can involve members of a specific collaboration team, social networking group, chat group, or other group. Alternatively, the conversations can be specific to a single individual regardless of other participants to the conversations.

Conversations can be stored in analytical data store 206 using various frameworks or schema that optionally can be specified by a user group or an individual user. Thus, different combinations of different types of data associated with each of communications 204 can be stored in analytical data store 206. The data, as described above, is represented by nodes in the conversations graph and can include, for example, message detail data comprising the body (text or voice-to-text rendering) of a communication, a subject, and assorted metadata. The data can include topic, theme, concept, and/or category identifiers (determined as described below).

The data can include for each communication a unique communication identifier that is extracted from or generated by a communication. The data can include a conversation identifier that identifies a series of communications comprising a single conversation. Absent data that includes a conversation identifier, conversation slipstream system 200 optionally can identify communications based, for example, on a conversation participant list (e.g., using the addressing format of "to," "cc," and "bcc" of an email or other electronic message). With respect to email messaging, specifically, a protocol such Simple Mail Transfer Protocol (SMTP), Post Office Protocol (POP), Internet Message Access Protocol (IMAP), or other standard protocol can be extended by using Multipurpose Internet Mail Extensions (MIME) or other format extension that supports text in characters sets other than ASCII, as well as supports attachments including audio, video, images, and application programs. Conversation slipstream system 200 can also hash the natural language of conversations using stemming or lemmatization, as described below.

Conversation slipstream system 200 can categorize conversation content and/or components contained in conversations using custom labels embedded in conversation content. For example, a vacation video clip within a conversation can be tagged with the custom label "this restaurant is a good place to each if you love local Italian food." Custom labels based on the MIME tags or labels can be used to categorize email messages, and conversation slipstream system 200 can treat unique MIME types as unique communications.

The data associated with each communication can include access control data generated from a membership list or extracted from a communication, which lists individuals with access rights to a conversation. The data can include an owner or author identifier associated with a specific communication.

Additionally, data associated with a communication can include location data (e.g., a GPS-determined location or region) with communication content that references a location. For example, within a conversation that includes the communication "this is a great place to eat if you like the local food," embedded location data can relate the reference "local food" to the location, "Italy," using the tag "local (Italian) food."

The data associated with a communication also can include a "tenant" identifier, defined as an organization, company, or other group of individuals using a specific messaging platform. A tenant identifier can be used for sharing data and storing corresponding communications in analytical data store 206, such that the stored data and corresponding communications are accessible only by individuals belonging to the organization, company, or other group. In certain embodiments, different groups or organizations that use the same messaging or collaboration platform (e.g., Slack) can agree to act as joint tenants who jointly collect and share conversations. Conversation slipstream system 200 can "federate" conversations from different messaging services by collecting—either for a specific group or an individual—conversations from the different messaging services or platforms. The federated conversations can be de-duplicated based on data (e.g., time of conversation, author, recipients, participants) and joined into a single thread based, for example, on various data indicators (e.g., time of conversation, author, recipients, participants).

A communication owner, author, or an individual given access control of a conversation can be represented by a node corresponding to a group user id (GUID) or email address. A "non-functional" user, defined herein as an individual who has access to but does not participate in a conversation, can be represented by a designated node uniquely corresponding to such a user. In the context of team collaborations, for example, such a user can be a team manager who is copied on team members' communications (e.g., email "cc"), but who does not communicate directly with the team members. For each instance and reference to each type of individual (e.g., author, recipient, participant, non-functional user) in a communication, an edge can connect a member node (corresponding to the individual) to a node representing a unique message identifier or ID.

Locations corresponding to the above-described location data are statically determined and, for each within a predetermined minimum degree or distance, a node corresponding to the location can be generated. A new node can be generated to represent two or more equidistant locations. An edge can connect each location node to the closest other location node.

Conversation slipstream system 200 also can associate various types of metadata with each conversation. Metadata can indicate, for example, an author or access control member's reputation or area of expertise. Metadata, for example, can provide a tone or sentiment indicator (determined as described below) that indicates the tone or sentiment of an author of and/or responder to a communication stored in analytical data store 206, the tone or sentiment based on the text of the communication and determined by a speech-to-text processor operatively coupled with conversation slipstream system 200.

As described above, both data and metadata are represented by nodes corresponding to the graph of a communication, the graph comprising a sub-graph when incorporated in the conversations graph representing the complete collection of conversations.

Conversation slipstream system 200, in certain embodiments, enables a user to specify thresholds based on associated data and/or metadata for determining which of the electronically stored conversations are candidates for possible inclusion in a slipstream generated by slipstream generator 208. For example, in certain embodiments, the user can specify that the analysis by slipstream generator 208 be limited to conversations that relate to one or more concepts or topics that are statistically correlated with a concept or topic identified in received secondary communication. Accordingly, conversation slipstream system 200 optionally can include one or more components for performing various statistical analyses (e.g., regression analysis, analysis of variance) and inclusion of a conversation (or communication extracted therefrom) can depend on the statistical analyses performed on the data and/or metadata associated with the conversation (or extracted communication).

Conversation slipstream system 200 can include components (e.g., process-executable instructions and/or application-specific processors not explicitly shown) that implement machine learning. For example, conversation slipstream system 200 can identify and classify topics, themes, concepts, and/or categories using machine learning. Conversation slipstream system 200 can implement natural language processing (NLP) and perform semantic analysis of information contained in a communication comprising text and/or voice. NLP is a field of computer science, artificial intelligence and linguistics that implements computer processes for performing machine-based recognition of human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis implemented with a computer can be used to construct meaning representations, semantic under-specification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by conversation slipstream system 200 to implement NLP and semantic analysis.

Using NLP and other machine learning, conversation slipstream system 200 can determine themes, topics and/or concepts and can classify communications by identifying word patterns that differ only in grammatical structure or style, but whose substantive content expresses the same or closely similar thoughts or sentiments. In one embodiment, the NLP performed by conversation slipstream system 200 analyzes the text of communications using a lemmatizer, a natural language processing technique that performs morphological analysis to identify the lemmas of distinct words in a conversation text. A lemma is the base or dictionary form of a word. For example, implementing a lemmatization, NLP treats a word such as "saw" as either "see" or "saw" depending on whether the word is used in the document as a verb or a noun, which can be determined by NLP using parts-of-speech tagging.

In another embodiment, the NLP performed by conversation slipstream system 200 uses a stemming procedure to reduce inflectional forms and derivationally related forms of words in the text of communications. Stemming typically requires less information than lemmatizing (which relies on a vocabulary and morphological analysis to lemmatize words), but is a less refined, more heuristic process that identifies the roots of words by eliminating word endings or derivational affixes of the words. The NLP performed by conversation slipstream system 200, in various embodiments, can implement different stemming algorithms, such as the Porter stemmer (which consists of five, sequentially applied phases of word reductions), Lovin stemmer, or Paice stemmer.

The capability of conversation slipstream system 200 to identify word patterns that differ only in grammatical structure or by virtue of stylistic differences enables the system to treat conversation phrases that convey the same thought or sentiment as equivalent in identifying word patterns.

In one embodiment, conversation slipstream system 200 uses a deep learning neural network to learn word vector representations through natural language models. Word vectors, wherein words are projected from a sparse 1-of-V encoding (V being the size of a predetermined vocabulary) onto a lower dimensional vector space via a hidden layer, are essentially feature extractors that encode semantic features of words. The dense representation of words that are close, either in a Euclidean or cosine distance sense, are thus semantically close or similar in the lower dimensional vector space. The deep learning neural network is but one of the different types of machine learning that can be implemented by conversation slipstream system 200. In other embodiments, conversation slipstream system 200 can implement other types of machine learning.

In an embodiment, conversation slipstream system 200 can implement a convolutional neural network (CNN) comprising layers with convolving filters for identifying word patterns based on a dense representation of words. Using a CNN, conversation slipstream system 200 can be trained to recognize word patterns occurring in a conversation and to classify the conversation according to concept, category, topic, or theme, for example.

In still another embodiment, conversation slipstream system 200 can use a clustering technique or algorithm (e.g., k-means clustering) for recognizing word patterns (e.g., phrases, sentences) to classify a communication. Conversation text, representing distinct objects, can be grouped into clusters or groups such that sufficiently similar patterns are partitioned into the same cluster or group. Based on the specific word pattern, a word pattern of conversation text can be classified using k-means clustering into one of k classes. The mean inter- and intra-class distances of word patterns in text are determined, and word patterns (as distinct objects) are moved iteratively from one cluster to another such that each move improves the value of a pre-selected criterion function. Each cluster can comprise word patterns corresponding to a conversation concept, category, topic, or theme. In other embodiments, conversation slipstream system 200 can implement other types of machine learning for classifying communications.

In other embodiments, conversation slipstream system 200 uses probabilistic topic modeling (e.g., latent Dirichlet allocation, bi-term topic model) to identify topics within each communication that is part of conversation included the aggregated collection of conversations. For example, given a specific number of topics, latent Dirichlet allocation (LDA) assigns a topic to each word in a collection of communication and extracts topics based on the number of words of each topic present in each communication. LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. Accordingly, the corpora of communications collected in analytical data store 206, as with other text corpora, can be analyzed by conversation slipstream system 200 using LDA to identify topics and extract topical indicia from the collected communications. In other embodiments, conversation slipstream system 200 can implement other types of machine learning to determine context and/or topics of a conversation.

In certain embodiments, conversation slipstream system 200 operatively couples with a natural language classifier (e.g., Watson™ Natural Language Classifier) to populate analytical data store 206 with concept and/or category data associated with collected conversations. The natural language classifier can be used in building text-based communication classification models by uploading training data. The natural language classifier once trained can generate best-match classes for a paragraph, sentence, or phrase. More generally, the populating of data in the analytical data store 206 can be performed using an artificial intelligence (AI) service provided by an AI system. One such AI system is the Watson™ system that is available from the International Business Machines (IBM) Corporation of Armonk, N.Y. The Watson™ system is an application of advanced natural language processing, information retrieval, knowledge representation and reasoning, and machine learning technologies.

Conversation slipstream system 200 optionally can include a tone analyzer that predicts sentiments or tones of the author of a communication based on the text of the communication. The tone analyzer, using linguistic analysis, initially parses a textual rendering of a communication into sentences and tokens. Nouns, verbs, and other parts of speech are identified by the tone analyzer using parts-of-speech tagging once the textual rendering is parsed into sentences and tokens. The tone analyzer determines the internal structure and meaning of the textual rendering (e.g., entities, purpose, and the like) by breaking the sentences into labeled phrases, including ones identified by the tone analyzer as specific sentiments (e.g., joy, fear, sadness, anger, frustration, excitement) and/or tones (e.g., analytical, confident, tentative). A machine learning model can train the tone analyzer to predict tones based on several categories of features including n-gram features, lexical features from different dictionaries, punctuation, and second-person references. The machine learning model, in one embodiment, can comprise a Support Vector Machine (SVM).

The tone analyzer optionally can incorporate capabilities for a communication author's sentiment or tone from voice-recorded communications. In accordance with the embodiment, the tone analyzer is operatively coupled with a speech-to-text engine to determine the communication author's tone based on speech output, either in real-time or based on recorded speech. Accordingly, by coupling conversation slipstream system 200 with a voice response system, the tone analyzer can perform tone analysis on voice communications.

Optionally, conversations graph constructor 202 can build a conversations graph by loading each collected conversation and associated data and/or metadata electronically stored in analytical data store 206 into Apache HBase with Spark and Spark GraphX. The conversations graph can be realized using the stored data and metadata as nodes and edges. For example, a unique communication identifier node can be identified as a composite key, which is a concatenation of tenant or conversation identifiers. A time-ordered edge can be used to connect one communication to prior communications having an equivalent tenant conversation prefix or conversation identifier, for example.

Slipstream generator 208 generates a conversation slipstream by selecting sub-graphs from the conversations graph and comparing the selected sub-graphs to a graph of a secondary communication. If a selected sub-graph is sufficiently similar to the graph of the secondary communication, then the communication represented by the sub-graph is incorporated in the conversation slipstream. The selecting, in various embodiments, can be performed visually and/or audibly using various mechanisms such as the representative ones described herein.

Different criteria can be used to determine a similarity between a sub-graph and the graph of the secondary communication. In some embodiments, similarity corresponds to the number of nodal paths of a sub-graph that match one or more nodal paths of the secondary communication. For example, a sub-graph may represent two or more communications within a conversation that are edge-connected by author nodes, by location nodes, and/or by nodes corresponding to one or more concepts, categories, topics, or themes. The number of nodal paths of a sub-graph that match a nodal path of the secondary communication graph can represent a similarity score that is compared to a threshold score that can be set by a user. Accordingly, only sub-graphs that meet or exceed the similarity score are selected.

The user can also specify the configuration of nodal paths by specifying the data and/or metadata this is relevant for generating a conversation slipstream. For example, if the user specifies one or more topics as relevant, then a nodal path is one that comprises nodes linked to the one or more topics. A concept-only nodal path, for example, has the form [communication i] [concept] [communication j], where i and j are integers. By contrast, however, if the user specifies that both concept and location data are relevant, for example, then a nodal path can have the form [communication i] [concept] [location] [communication j] [concept].

Operatively, slipstream generator 208 can analyze sub-graphs, as well as a graph of the secondary communication, by "walking" the nodal paths—that is, by traversing a path of edge-connected nodes and sequentially identifying nodes beginning with a first node and ending with an n-th node, wherein each of the n nodes are connected by an edge. Slipstream generator 208 can identify a time-ordered sequence of communications comprising a conversation and begin the analysis at the earliest of the communications. Each nodal path can be walked beginning with the node from the earliest communication that contains a corresponding node on the path. Optionally, the user can set the extent that slipstream generator 208 "walks" a nodal path by specifying a minimum (e.g., 1 degree) and/or a maximum (e.g., 5 degrees) number of nodes that are traversed on each nodal path. Once a sub-graph is identified for inclusion in a slipstream, slipstream generator 208 can extract the corresponding conversation using, for example, a Spark GraphX query. Optionally, to mitigate operative overhead, a user can limit the "depth" of the slipstream generated by slipstream generator 208 by setting a maximum number of communications to include within the slipstream, though typically a slipstream will include at least two communications.

Not all communications of a conversation whose sub-graph may match a graph of the secondary communication necessarily merit inclusion in generating a conversation slipstream. For example, a conversation may include numerous communications that relate to numerous concepts, only one or some of which are relevant to a secondary communication. Slipstream generator 208 can prune the nodal paths of selected sub-graphs to determine a primary path of a conversation. As defined herein, "pruning" means selectively removing one or more nodes or edges from a graph. The primary path of can be identified as edge-connected nodes with individual subsidiary communications (e.g., messages, posts) that satisfy a predetermined, user-specified criterion. For example, the primary path can comprise nodes of subsidiary communications having the highest number views (e.g., number of views of a social networking platform posting). The primary path, for example, can comprise nodes of subsidiary communications having the highest participation (that is, the greatest number of conversation participants or number of participants greater than a user-specified minimum). The communications whose nodes are connected along the primary path are selected for inclusion in the slipstream generated by slipstream generator 208. Other nodal paths are pruned by excluding communications from the slipstream communications that do not include nodes connected along the primary path.

In still other embodiments, a primary path can be determined based on a resolution status of one or more subsidiary communications. "Resolution" is defined as a classification indicating whether a conversation (or communication) is complete, incomplete, or evolving (e.g., in-process). Thus, a resolution provides a classification status, such as whether a stated goal or a proposed agreement is reached after a sequence of communications, in which event the conversation's resolution is "complete." Conversely, an "incomplete" resolution is the classification status that corresponds to a conversation that has not achieved a stated goal or reached a proposed agreement. A resolution status of a conversation can be determined using the machine learning aspects described above. As described above, an aspect of the machine learning that can be performed by conversation slipstream system 200 is the ability to classify communications based on word patterns. Using this capability, conversation slipstream system 200 can classify communications as merely introductory (e.g., giving a salutation or introduction to conversation participants) and thus incomplete, as complete (e.g., offering a summary or concluding remarks, thanking participants for engaging in the conversation), or inconclusive (e.g., setting a time for a next conversation, expressing a need for further information or conversation) but in-process or otherwise evolving with an anticipated follow-on conversation.

Based on the resolution of a communication determined using a machine-learned classification model, slipstream generator 208 can identify a primary path as one comprising nodes corresponding to subsidiary communications categorized by a specified resolution status. For example, the user can specify that only resolved or completed communications be included in the conversation slipstream and that incomplete or evolving communications be excluded. Then, accordingly, the primary path is identified by slipstream generator 208 as one that links nodes of subsidiary communications whose status is classified based on the applicable machine learning model as completed (or concluded) conversations.

In generating a conversation slipstream, slipstream generator 208 analyzes conversations electronically stored in analytical data store 206 as already described. In certain embodiments, slipstream generator 208 can analyze only those conversations that are selected based on membership in a community. As defined herein, "community" is group of individuals that regularly exchange communications over an electronic communications network using one or more messaging platforms. The slipstream generator 208 can analyze community conversations based on tone or sentiments of members of the community with respect to specific topics, the tone or sentiments determined with the tone analyzer as also described above. Based on a sentiment analysis, slipstream generator 208 can determine which conversations to analyze for possible inclusion in the conversation slipstream. For example, with respect to a conversation among some members of the community regarding an identified topic, conversations that are determined based on the sentiment analysis to engender negative sentiment (e.g., anger, frustration) can be excluded from the conversation slipstreams generated by slipstream generator 208. Conversely, those conversations determined to engender positive sentiment (e.g., joy, excitement) can be selected for inclusion in conversation slipstreams generated by slipstream generator 208.

In some embodiments involving such a community, conversation slipstream system 200 generates a template for matching a received secondary communication with one or more prior conversations electronically stored in analytical data store 206 based on sentiment analysis of community conversations. The template can match a received secondary communication with prior conversations of the community that are identified by the tone analyzer as exhibiting specific sentiments or emotions (e.g., joy, fear, sadness, anger, frustration, excitement) and/or tones (e.g., analytical, confident, tentative) with respect to the topic of the secondary communication. For example, slipstream generator 208 can use above-described classification techniques to classify secondary communications as ones that benefit from conversation slipstreams comprising communications that evince a specific sentiment (e.g., excitement) and/or tone (e.g., confident). Thus, if the secondary communication is classified as a type (e.g., a sales meeting, group presentation) that benefits from the conversations of one or more individuals whose communications are confident or enthusiastic about the topic, slipstream generator 208 selects on-topic communications electronically stored in analytical data store 206 that are identified as exhibiting the specific sentiment (e.g., excitement) or tone (e.g., confident). For example, an in-process community conversation may pertain to an upcoming sales presentation to be made by members of the community. Accordingly, slipstream generator 208 can generate a conversation slipstream that comprises communications that relate to the topic of the upcoming sales presentation and that are identified by the tone analyzer as exhibiting a specific sentiment (e.g., excitement) and/or tone (e.g., confident) beneficial to a secondary communication of the in-process community conversation. The communications selected by slipstream generator 208 for inclusion in the conversation slipstream are identified by the template, which matches a secondary communication with conversations based on the sentiment analysis as well as the topic or topics of the secondary communication.

Additionally, or alternatively, a template for matching a received secondary communication with one or more prior conversations electronically stored in analytical data store 206 can be based on a classification of conversation patterns, determined based on a classification model constructed using machine learning as described above. Certain conversation pattern can be classified as a success or a failure. In certain embodiments, a conversation is a "success" if an initial incomplete communication (determined as described above) is followed by a subsequent, complete communication (also determined as described above) within a predetermined time and/or after no more than a predetermined maximum number of intervening communications. For a received secondary communication among community members pertaining to a specific topic, the template can match the received secondary communication with one or more prior conversations electronically stored in analytical data store 206 that are deemed successes and that relate to the specific topic. Accordingly, slipstream generator 208 generates a conversation slipstream comprising prior conversations on the topic by selecting ones that the template identifies as successes and excludes ones deemed a failure regardless of topic.

As described above, slipstream propagator 210 propagates conversation slipstream 222 generated by slipstream generator 208 to one or more conversation participants by conveying the conversation slipstream over an electronic communications network. Optionally, in accordance with certain embodiments, slipstream propagator 210 can present any conversation slipstream by combining the conversation slipstream and a secondary communication. Slipstream propagator 210 can combine the conversation slipstream and secondary communication to create an enhanced conversation. The enhanced conversation can complete an incomplete conversation, resolve an evolving conversation, add information that fills an information gap, or otherwise embellishes the secondary communication and or a communication contained in the conversation slipstream. In certain embodiments, background color or other visual indicator can highlight portions of the enhanced communication corresponding to the extracted communications comprising the conversation slipstream. The background color also can indicate an urgency and/or priority associated with one or more portions of the enhanced conversation.

An enhanced conversation can complete an incomplete or evolving conversation by combining the secondary communication and the slipstream in a presentation order that completes or resolves the incomplete or evolving conversation. For example, a secondary communication may reinitiate a conversation that ended inconclusively by inviting participants to rejoin the conversation at a specified date and time. Slipstream propagator 210 can combine the invitation (secondary communication) with the earlier conversation (conversation slipstream) such that when the resulting enhanced conversation is propagated, the conversation slipstream combines with the secondary communication in a manner that both informs the recipients of the data and time for resuming the conversation while also providing the invitees with the information that was previously discussed. This allows the conversation to resume without the participants having to expend time and effort in recalling or rehashing their earlier conversation.

Slipstream propagator 210 can combine the secondary communication and conversation slipstream in any order. Slipstream propagator 210 also can split a communication (either secondary or conversation slipstream) and insert one conversation within the split communication to generate a logically ordered enhanced communication. The logical ordering can be determined, for example, based on topic identification and/or time-ordering.

In various embodiments, slipstream propagator 210 can determine how to combine the conversation slipstream with the secondary communication using a machine-learned classification model. As described above, a machine-learned classification model can classify a communication according to a predefined resolution status. The communication can be one that is extracted from a conversation electronically stored in analytical data store 206 and/or a secondary communication received over an electronic communications network. In combining the secondary communication and the conversation slipstream generated by slipstream generator 208, slipstream propagator 210 can determine based on the resolution status whether one communication—either extracted communication or secondary communication—is incomplete and the other complete. Slipstream propagator 210 can insert the secondary communication into the conversation slipstream to complete an incomplete communication. For example, if the extracted conversation is incomplete, the secondary communication can be added to the conversation slipstream at the end point of the extracted conversation. If the secondary communication is incomplete, however, the secondary communication can be added to the conversation slipstream at the start point of the extracted conversation, for example.

Referring again to FIG. 3, these procedures can be further described by assuming that sub-graph 300 represents a conversation that occurred on a team collaboration platform concerning a specific concept (e.g., system automation, Python programming) represented by concept node 308. In the conversation, Carol describes to Peter a project that her team is undertaking and directs questions to Peter regarding the specific concept (e.g., system automation, Python programming) in communication 1 represented at node 302. Peter may respond in communication n represented at node 304 by saying that he can answer Carol's questions but will need to do so later during another conversation. Thus, the conversation ends inconclusively, and the conversation's resolution status is marked as in-process or continuing (determined according to a classification by the machine-learned classification model). If later, Peter finds the time to resume the conversation and in a new (secondary) conversation communicates that to Carol, then coherent conversation constructor 210 can create an enhanced conversation by combining the secondary communication at the end point of a conversation slipstream that comprises the prior conversation (represented by the sub-graph containing communications 1 and communication n. The resulting enhanced conversation can save Peter the time and effort of having to track down his earlier communication with Carol in order to recall the precise issues that Carol was asking about. Carol and Peter can initiate a new conversation already having been automatically supplied with the information that Peter needs to respond effectively to Carol and both can immediately resume the conversation without having to rehash their earlier discussion.

In a different scenario, sub-graph 300 may represent a conversation in which Carol provided a detailed discourse on a concept represented by concept node 308 during a conversation with Peter. The conversation comprises communication 1 represented by node 302 and communication n represented by node 304, both connected by conversation ID edge 306 and connected to concept node 308 by concept edges 310 and 312, respectively. The concept represented by concept node 308 is relevant to a project she and Peter were working on. Later, a secondary communication between two different individuals may concern a wholly unrelated project that, though entirely different from Carol and Peter's, nonetheless involves the same concept that Carol and Peter discussed extensively in their earlier conversation represented by sub-graph 300. Assume that, with respect to the secondary communication, the two individuals begin discussing their project and before concluding the discussion raise concerns about needing more information on the same concept that in the context of the unrelated project Carol discussed extensively with Peter. Although the secondary communication concludes, a question regarding the concept remains. That is, there is within the secondary communication, a subsidiary conversation identifiable as incomplete.

Assume moreover that the participants to the secondary communication are members of the same organization as Carol and Peter and have legitimate access to Carol and Peter's communications on an organization-wide collaboration platform. Even if the different conversation participants are members of different enterprises, the different enterprises may operate under an information sharing agreement, as described above. Accordingly, slipstream propagator 210 can create an enhanced conversation by separating the secondary communication into constituent parts, the separation being that point in which a communication expresses a need for more information. Slipstream propagator 210 can insert (or patch) into the secondary communication, at the point of separation, a conversation slipstream comprising the portions of Carol's detailed discourse on the concept that based on the respective nodal paths of the communications is identified as relevant to the secondary communication as well. Thus, even though the two projects are unrelated, a concept common to both is identified, and information from an earlier discussion about the concept is automatically added to a subsequent discussion (secondary communication) at a point that creates an enhanced conversation about the concept. Participants that otherwise may have been wholly unaware of the earlier conversation about an unrelated project nevertheless gain the benefit of the discussion about the same concept relevant to the unrelated projects.

Conversation slipstream system 200 in certain embodiments optionally promotes as well as propagates a conversation slipstream. As noted above, the paths and patterns of the edge-connected nodes of a graph or sub-graph can be used to distinguish one graph or sub-graph from another, as well as determine whether and to what degree the graphs or sub-graphs are similar. Using the paths and patterns, conversation slipstream system 200 can encourage individuals to join a conversation as participants. For example, individuals (represented as distinct nodes) identified within one or more collected conversations may be logically related based on expertise or experience to a certain topic (indicated by edges connecting the individual-indicating nodes to topic nodes). In the event that a secondary communication is determined to be part of an evolving a conversation relating to the topic but not involving the individuals (indicated by the absence of individual-indicating nodes), conversation slipstream system 200 can convey a conversation slipstream (extracted communications regarding the topic) to the individuals along with an invitation to join the evolving conversation.

Figure 4:
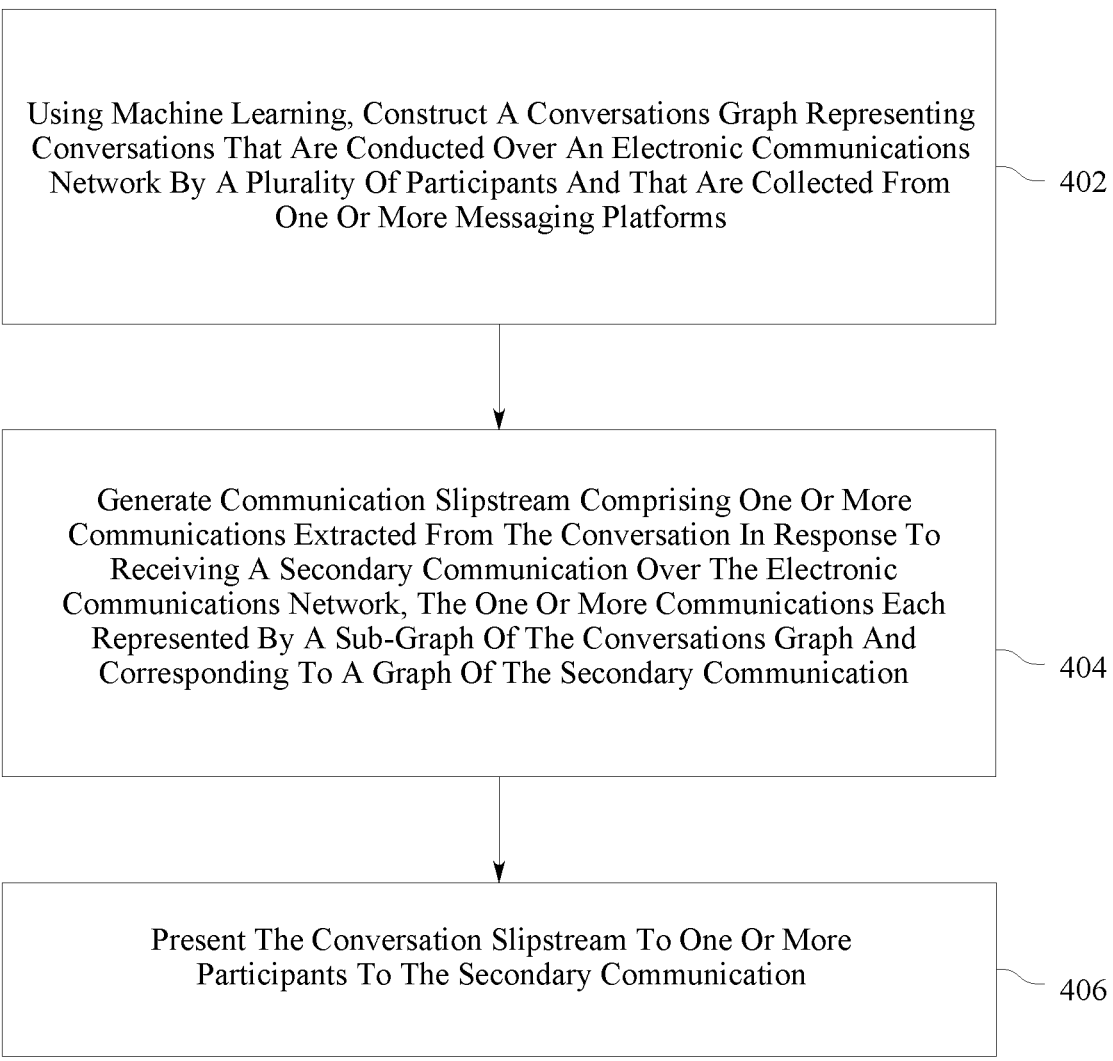
FIG. 4 is a flowchart of a method for conversation slipstream propagation according to an embodiment.

FIG. 4 is a flowchart of method 400 for conversation slipstream propagation according to an embodiment. Method 400 can be performed by a system the same or similar to the systems described with reference to FIGS. 1-3. The system at block 402, using machine learning, constructs a conversations graph. The conversations graph comprises nodes and edges that represent conversations that are conducted over an electronic communications network by a plurality of participants and that are collected from one or more messaging platforms. The one or more messaging platforms can include team collaboration platforms, social networking platforms, and/or other, similar platforms that are communicatively coupled with one or more electronic communications networks.

The system at block 404 generates a conversation slipstream. The conversation slipstream comprises one or more communications. Each of the one or more communications is extracted from the conversations in response to receiving a secondary communication over one of the one or more electronic communications networks. Each of the one or more communications is extracted from a communication represented by a sub-graph of the conversations graph that corresponds to a graph of the secondary communication.

At block 406, the system presents the conversation slipstream to one or more participants to the secondary communication. The system can propagate the conversation slipstream to one or more participants over the electronic communications network.

Optionally, the system can combine the conversation slipstream with the secondary communication to create an enhanced conversation. The system can propagate the enhanced conversation to one or more conversation participants over the electronic communications network.

The system, in accordance with some embodiments, can generate the conversation slipstream by selecting one or more sub-graphs of the conversations graph and comparing each of the one or more sub-graphs selected to the graph of the secondary communication. Based on the comparisons, the system can select one or more of the sub-graphs based on determining that each sub-graph selected exhibits a predefined similarity with the graph of the secondary communication. The system, in accordance with some embodiments, can select the one or more sub-graphs based on determining a primary nodal path of each of the one or more sub-graphs and comparing the primary nodal path of each sub-graph to the graph of the secondary communication.

In some embodiments, the system can select one or more of the sub-graphs by determining a resolution of a nodal path in each sub-graph. The resolution can indicate whether a communication corresponding to a sub-graph is complete, incomplete, or in-process and continuing. The system can determine a communication's resolution by classifying the communication using a machine-learned classification model. Alternatively, or additionally, the system can select one or more of the sub-graphs based on a view number of the communication represented by each sub-graph. The system alternatively, or additionally, can select one or more of the sub-graphs based on a participation number of each communication represented by each sub-graph. The participation number can correspond to the number of participants to the communication, including the author of the communication and/or one or more recipient of the communication.

The system can generate a conversation slipstream that comprises a sequence of time-ordered communications. Accordingly, the coherent conversation can be created by inserting the secondary communication into the sequence at a position determined by a time associated with the secondary communication.

Alternatively, or additionally, the system can create an enhanced conversation by determining a resolution status of the secondary communication and a communication included in the conversation slipstream. The system then can insert the secondary communication into the conversation slipstream at a position within the slipstream that is selected based on the resolution status of the secondary communication and resolution status of a communication included in the conversation slipstream. The secondary communication can be inserted in the slipstream at a position that completes an incomplete or in-process secondary communication.

In some embodiments, the system can generate the slipstream by selecting for inclusion in the slipstream one or more communications based on certain data and/or metadata associated with the one or more communications. For example, the system can select or reject a communication for inclusion in the slipstream based on a reputation of a participant to a conversation from which the communication is extracted. The system can select or reject a communication for inclusion in the slipstream, for example, based on an expertise of a participant to a conversation from which the at least one communication is extracted. The system can select or reject a communication for inclusion in the slipstream based on a sentiment associated with the communication, for example. The system can determine sentiment using a tone analyzer.

It is understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
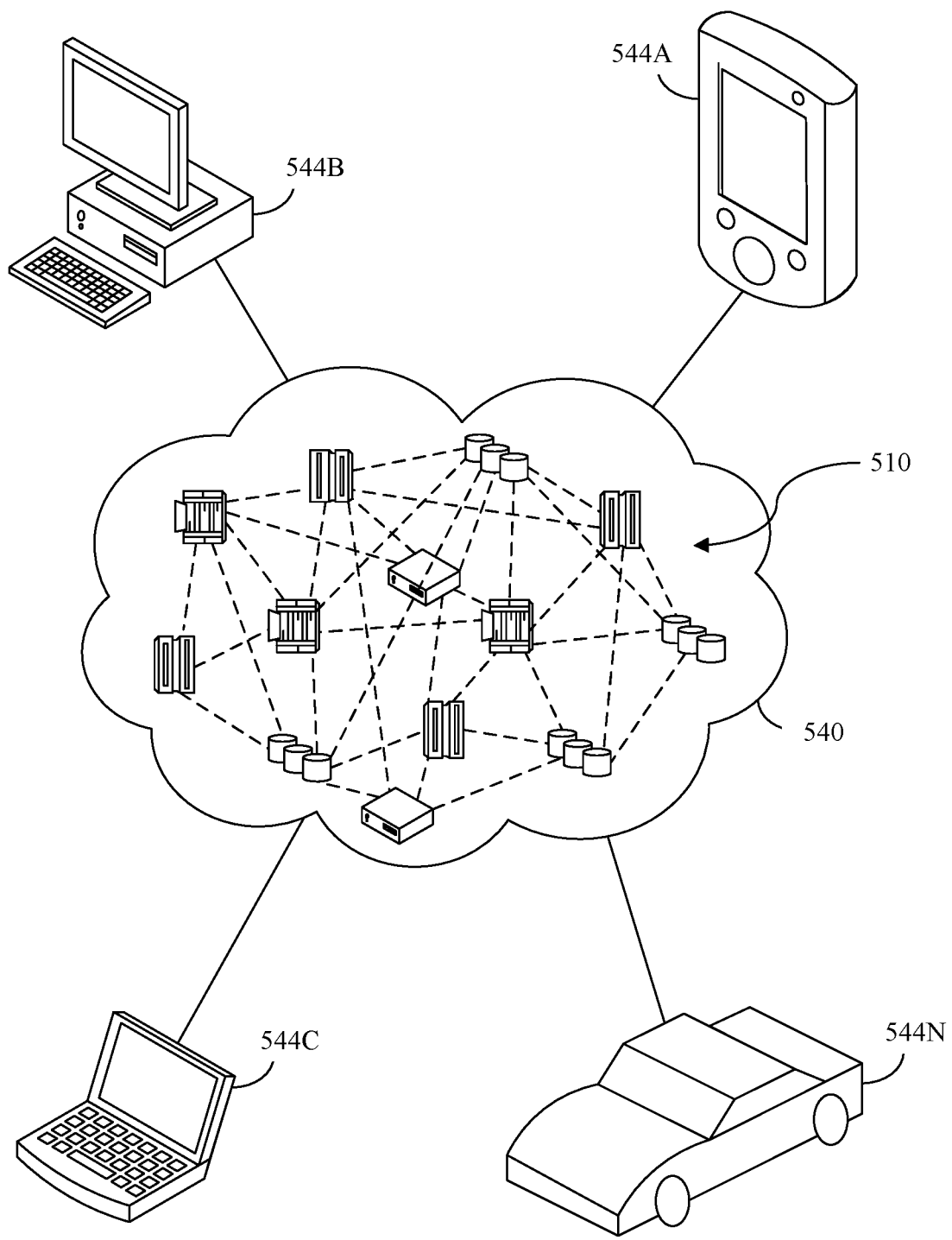
FIG. 5 depicts a cloud computing environment according to an embodiment.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540a, desktop computer 540b, laptop computer 540c, and/or automobile computer system 540n may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54a-n shown in FIG. 5 are intended to be illustrative only and that computing nodes 510 and cloud computing environment 500 can communicate with any type of computerized device over any type of network and/or network addressable connection (e.g., using a web browser).

Figure 6:
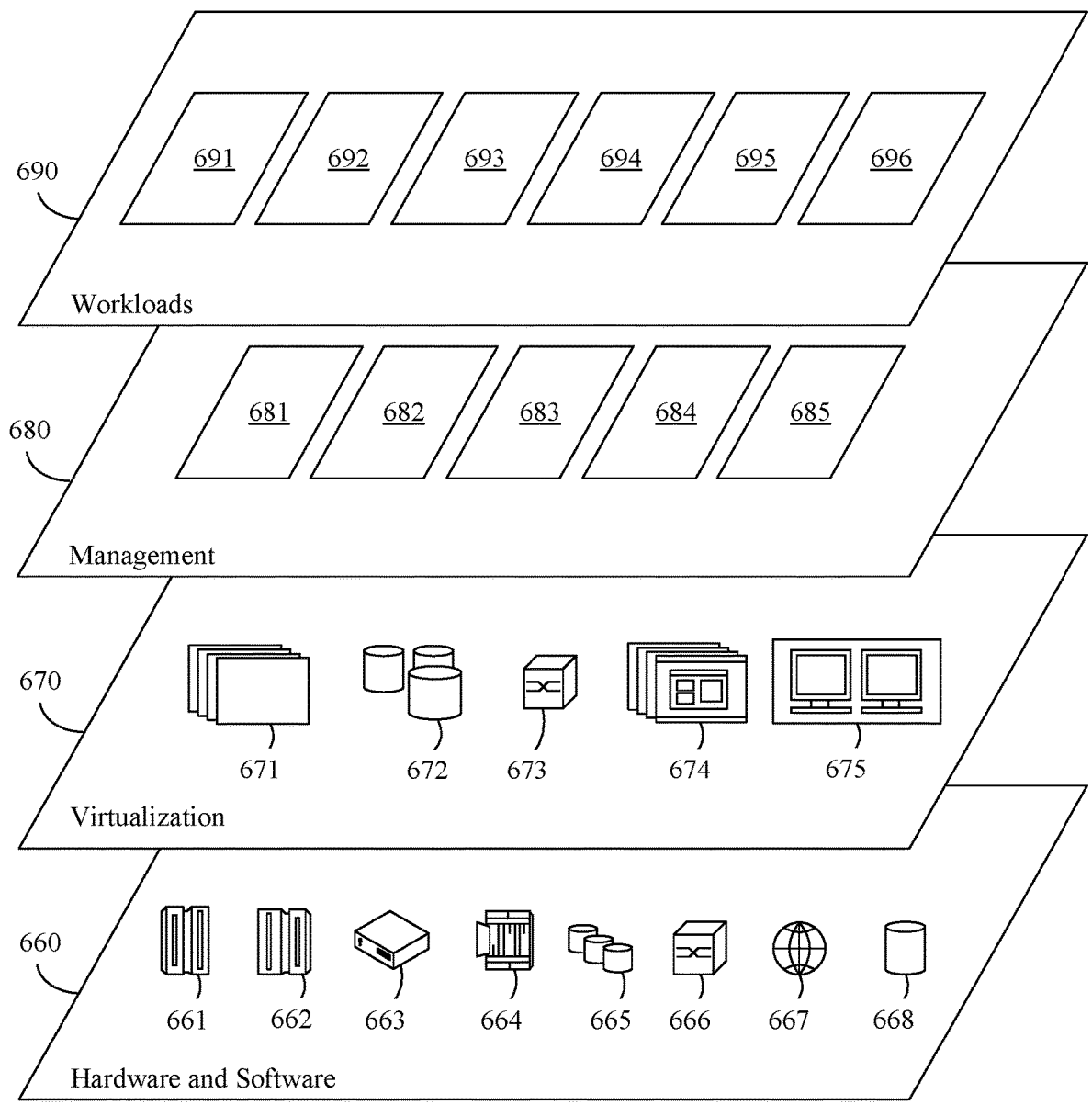
FIG. 6 depicts abstraction model layers according to an embodiment.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 6663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA. Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and conversation slipstream system 696.

Figure 7:
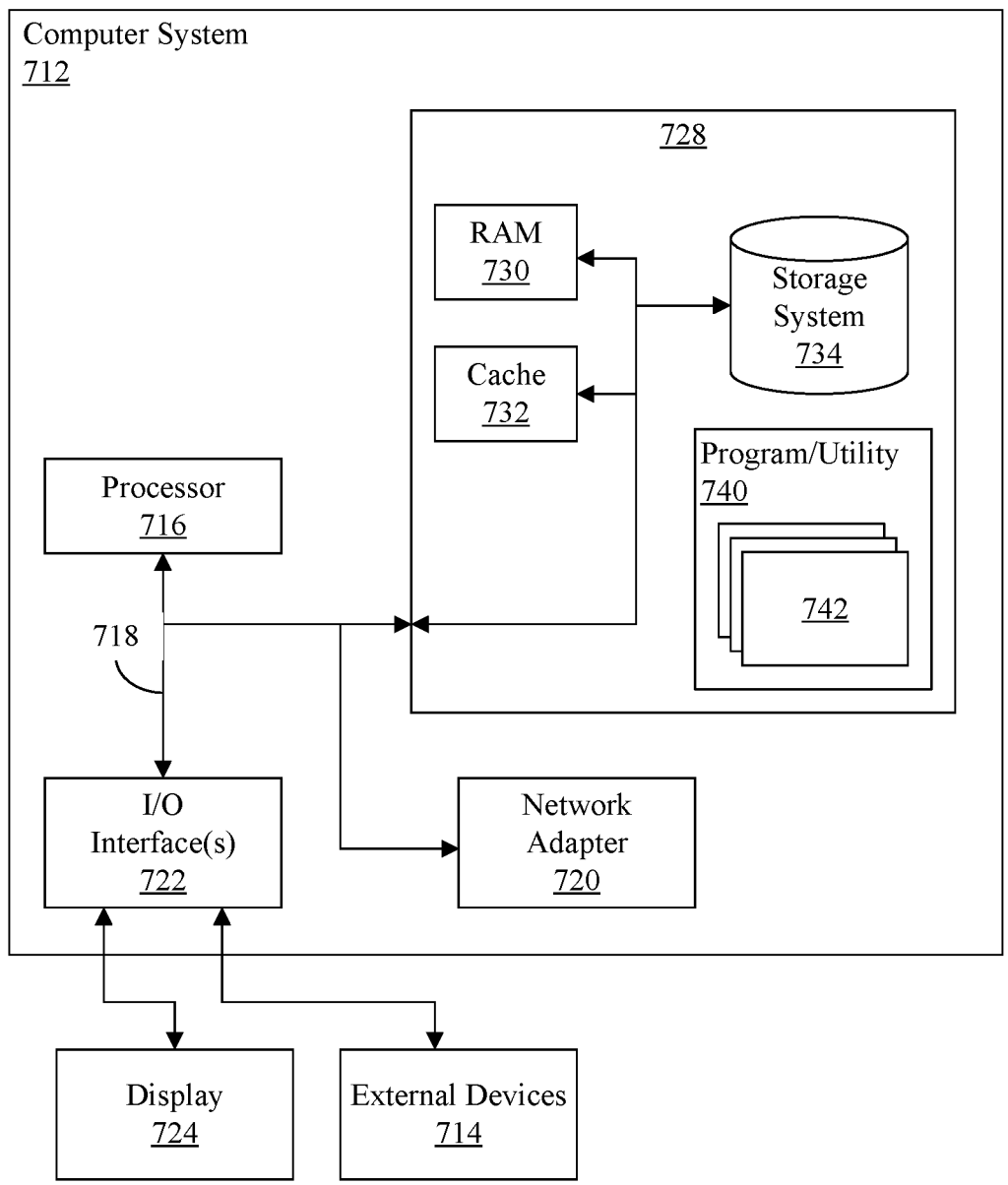
FIG. 7 depicts a cloud computing node according to an embodiment.

FIG. 7 illustrates a schematic of an example of a computing node 700. In one or more embodiments, computing node 700 is an example of a suitable cloud computing node. Computing node 700 is not intended to suggest any limitation as to the scope of use or functionality of embodiments of the invention described herein. Computing node 700 is capable of performing any of the functionality described within this disclosure.

Computing node 700 includes a computer system 712, which is operational with numerous other general-purpose or special-purpose computing system environments or configurations. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system-executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors 716, a memory 728, and a bus 718 that couples various system components including memory 728 to processor 716. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 718 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 712 typically includes a variety of computer system-readable media. Such media may be any available media that is accessible by computer system 712, and may include both volatile and non-volatile media, removable and non-removable media.

Memory 728 may include computer system readable media in the form of volatile memory, such as random-access memory (RAM) 730 and/or cache memory 732. Computer system 712 may further include other removable/non-removable, volatile/non-volatile computer system storage media. By way of example, storage system 734 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, one or more of the program modules may include conversation slipstream system 696 or portions thereof.

Program/utility 740 is executable by processor 716. Program/utility 740 and any data items used, generated, and/or operated upon by computer system 712 are functional data structures that impart functionality when employed by computer system 712. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via input/output (I/O) interfaces 722. Still, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

While computing node 700 is used to illustrate an example of a cloud computing node, it should be appreciated that a computer system using an architecture the same as or similar to that described in connection with FIG. 7 may be used in a non-cloud computing implementation to perform the various operations described herein. In this regard, the example embodiments described herein are not intended to be limited to a cloud computing environment. Computing node 700 is an example of a data processing system. As defined herein, "data processing system" means one or more hardware systems configured to process data, each hardware system including at least one processor programmed to initiate operations and memory.

Computing node 700 is an example of computer hardware. Computing node 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 700 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "individual," and "participant" refer to a human being. Likewise, as defined herein "users," "individuals," and "participants" refer to human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
constructing, with computer hardware using machine learning, a conversations graph representing conversations among a plurality of participants conducted over an electronic communications network by the plurality of participants and collected from at least one messaging platform;
generating a conversation slipstream comprising at least one communication extracted from the conversations in response to receiving a secondary communication over the electronic communications network, the at least one communication represented by a sub-graph of the conversations graph that corresponds to a graph of the secondary communication, wherein the generating the conversation slip stream comprises:
selecting sub-graphs of the conversations graph and comparing each sub-graph selected to the graph of the secondary communication and determining a predefined similarity based on the comparing, the selecting the sub-graphs of the conversation comprising determining a resolution of a nodal path in each sub-graph, the resolution being a classification indicating whether the conversation is complete, incomplete or evolving; and
determining a primary path of at least one of the conversations by identifying edge-connected nodes of the conversation's sub-graph having individual subsidiary communications that satisfy at least one specified criterion, and pruning other nodal paths from that conversation's sub-graph; and
presenting the conversation slipstream to at least one participant to the secondary communication.

2. The method of claim 1, wherein the presenting comprises combining the conversation slipstream and the secondary communication, and presenting the conversation slipstream to the at least one participant in combination with the secondary communication.

3. The method of claim 1, wherein the selecting further comprises determining a primary nodal path of each sub-graph and comparing the primary nodal path of each sub-graph to the graph of the secondary communication.

4. The method of claim 1, wherein the selecting further comprises determining:
a participation number of each communication represented by each sub-graph, the participation number corresponding to a number of the plurality participants to the communication.

5. The method of claim 1, further comprising determining a resolution status of the secondary communication and a communication included in the conversation slipstream and inserting the secondary communication into the conversation slipstream at a position within the slipstream wherein the position is selected based on the resolution status of the secondary communication and a communication included in the conversation slipstream, the resolution status indicating whether the secondary communication is complete, incomplete or evolving.

6. The method of claim 1, wherein the generating comprises selecting the at least one communication based on at least one of a reputation of a participant to a conversation from which the at least one communication is extracted.

7. A system, comprising:
a processor configured to initiate operations including:
constructing, using machine learning, a conversations graph representing conversations conducted among a plurality of participants over an electronic communications network by the plurality of participants and collected from at least one messaging platform;
generating a conversation slipstream comprising at least one communication extracted from the conversations in response to receiving a secondary communication over the electronic communications network, the at least one communication represented by a sub-graph of the conversations graph that corresponds to a graph of the secondary communication, wherein the generating the conversation slip stream comprises:
selecting sub-graphs of the conversations graph and comparing each sub-graph selected to the graph of the secondary communication and determining a predefined similarity based on the comparing, the selecting the sub-graphs of the conversation comprising determining a resolution of a nodal path in each sub-graph, the resolution being a classification indicating whether the conversation is complete, incomplete or evolving; and
determining a primary path of at least one of the conversations by identifying edge-connected nodes of the conversation's sub-graph having individual subsidiary communications that satisfy at least one specified criterion, and pruning other nodal paths from that conversation's sub-graph; and
presenting the conversation slipstream to at least one participant to the secondary communication.

8. The system of claim 7, wherein the presenting comprises combining the conversation slipstream and the secondary communication, and presenting the conversation slipstream to the at least one participant in combination with the secondary communication.

9. The system of claim 7, wherein the selecting comprises determining a primary nodal path of each sub-graph and comparing the primary nodal path of each sub-graph to the graph of the secondary communication.

10. The system of claim 7, wherein the selecting further comprises determining:
a participation number of each communication represented by each sub-graph, the participation number corresponding to a number of the plurality participants to the communication.

11. The system of claim 7, wherein the processor is configured to initiate operations further comprising:
determining a resolution status of the secondary communication and a communication included in the conversation slipstream; and
inserting the secondary communication into the conversation slipstream at a position within the slipstream wherein the position is selected based on the resolution status of the secondary communication and the communication included in the conversation slipstream, the resolution status indicating whether the secondary communication is complete, incomplete or evolving.

12. A computer program product, the computer program product comprising:
one or more non-transitory computer-readable storage media and program instructions collectively stored on the one or more non-transitory computer-readable storage media, the program instructions executable by a processor to cause the processor to initiate operations including:
constructing, using machine learning, a conversations graph representing conversations conducted among a plurality of participants over an electronic communications network by the plurality of participants and collected from at least one messaging platform;
generating a conversation slipstream comprising at least one communication extracted from the conversations in response to receiving a secondary communication over the electronic communications network, the at least one communication represented by a sub-graph of the conversations graph that corresponds to a graph of the secondary communication, wherein the generating the conversation slip stream comprises:
selecting sub-graphs of the conversations graph and comparing each sub-graph selected to the graph of the secondary communication and determining a predefined similarity based on the comparing, the selecting the sub-graphs of the conversation comprising determining a resolution of a nodal path in each sub-graph, the resolution being a classification indicating whether the conversation is complete, incomplete or evolving; and
determining a primary path of at least one of the conversations by identifying edge-connected nodes of the conversation's sub-graph having individual subsidiary communications that satisfy at least one specified criterion, and pruning other nodal paths from that conversation's sub-graph; and
presenting the conversation slipstream to at least one participant to the secondary communication.

13. The computer program product of claim 12, wherein the presenting comprises combining the conversation slipstream and the secondary communication, and presenting the conversation slipstream to the at least one participant in combination with the secondary communication.

14. The computer program product of claim 12, wherein the selecting further comprises determining a primary nodal path of each sub-graph and comparing the primary nodal path of each sub-graph to the graph of the secondary communication.

15. The computer program product of claim 12, wherein the selecting further comprises determining:
a participation number of each communication represented by each sub-graph, the participation number corresponding to a number of the plurality participants to the communication.

16. The computer program product of claim 12, wherein the program instructions are executable by the processor to cause the processor to initiate operations further comprising:
determining a resolution status of the secondary communication and a communication included in the conversation slipstream; and inserting the secondary communication into the conversation slipstream at a position within the slipstream wherein the position is selected based on the resolution status of the secondary communication and the communication included in the conversation slipstream, the resolution status indicating whether the secondary communication is complete, incomplete or evolving.

17. The computer program product of claim 12, wherein the generating comprises selecting the at least one communication based on at least one of a reputation of a participant to a conversation from which the at least one communication is extracted.

18. The system of claim 7, wherein the generating comprises selecting the at least one communication based on at least one of a reputation of a participant to a conversation from which the at least one communication is extracted.

\* \* \* \* \*